United States Patent [19]

Volz et al.

[11] Patent Number: 4,509,237
[45] Date of Patent: Apr. 9, 1985

[54] ARRANGEMENT CONTAINING A CONTROLLED DEFLECTION ROLL AND RELATED REGULATOR

[75] Inventors: Karl Volz, Baindt; Christoph Link; Wolf-Gunter Stotz, both of Ravensburg; Peter Heitmann, Ravensburg-Oberhofen, all of Fed. Rep. of Germany

[73] Assignee: Escher Wyss Aktiengesellschaft, Zürich, Switzerland

[21] Appl. No.: 372,011

[22] Filed: Apr. 26, 1982

[30] Foreign Application Priority Data

May 2, 1981 [DE] Fed. Rep. of Germany ....... 3117398

[51] Int. Cl.³ .............................................. B21B 13/14
[52] U.S. Cl. .......................... 29/116 AD; 29/113 AD; 72/11; 100/162 B
[58] Field of Search ...... 29/116 AD, 113 AD, 113 R; 72/21, 8, 11, 243, 245; 33/182; 100/162 B, 46, 47; 241/30, 37, 231, 234; 264/175

[56] References Cited

U.S. PATENT DOCUMENTS

| | | | |
|---|---|---|---|
| 2,100,653 | 11/1937 | Umansky | 100/47 X |
| 4,074,624 | 2/1978 | Biörnstad et al. | 29/116 AD X |
| 4,110,387 | 8/1978 | Wöckener et al. | 264/175 X |
| 4,157,066 | 6/1979 | Pretty | 100/46 |
| 4,357,743 | 11/1982 | Hefter et al. | 29/113 AD X |

Primary Examiner—Howard N. Goldberg
Assistant Examiner—Joseph M. Gorski
Attorney, Agent, or Firm—Werner W. Kleeman

[57] ABSTRACT

An arrangement containing a controlled deflection roll which is supported by means of support or pressure elements against a roll support or beam. There is also provided a regulation arrangement for regulating the position of the roll shell, wherein the position of the roll shell at least at both of its opposed ends is detected by position sensors or feelers and deviations from a set or reference value are processed into two adjustment or positioning magnitudes which act upon the support or pressure elements. Both of the adjustment magnitudes are formed while taking into account a possible difference between both of the reference value-actual value differences and thereafter weighted and grouped together with further adjustment magnitudes and inputted to the support or pressure elements.

6 Claims, 1 Drawing Figure

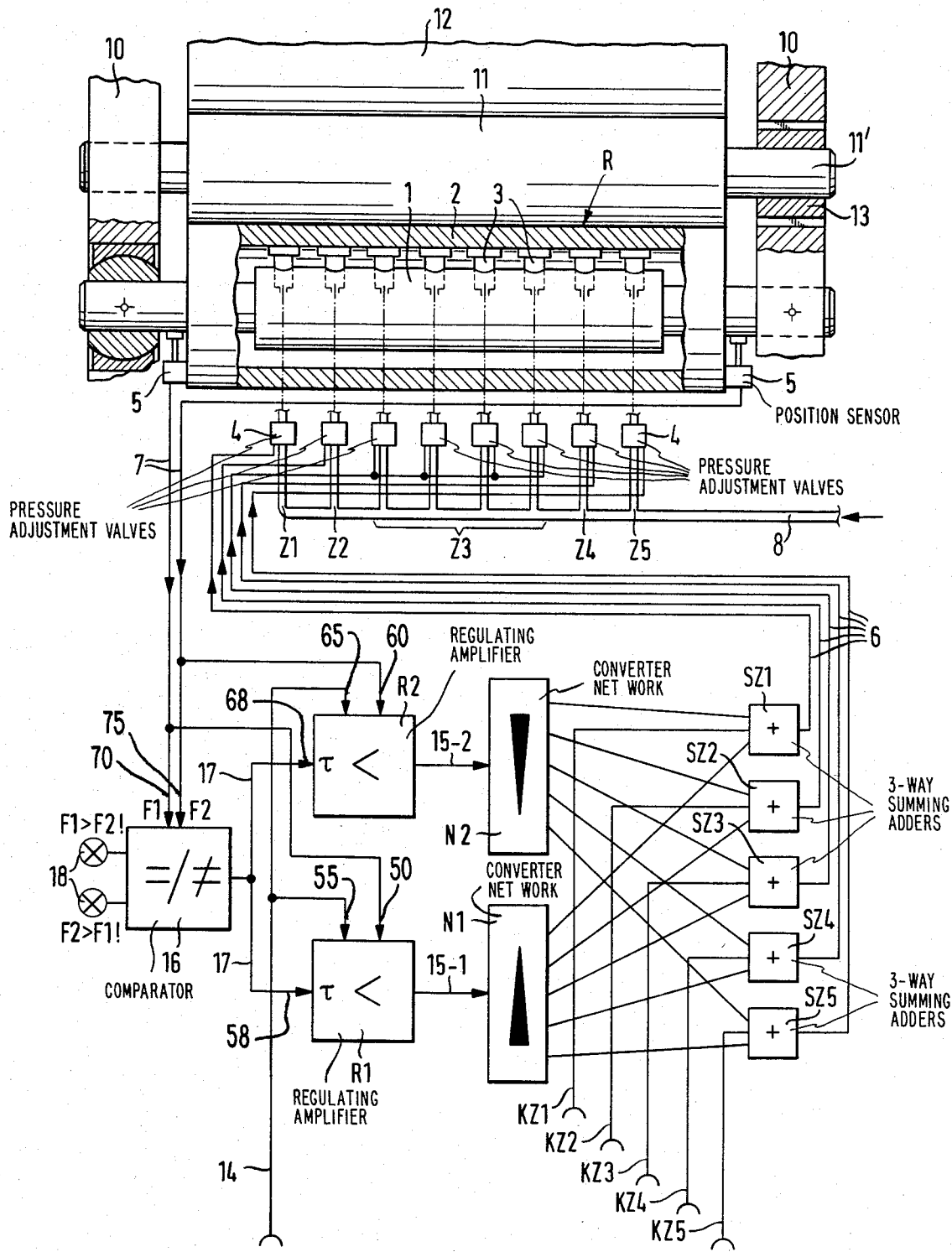

ARRANGEMENT CONTAINING A CONTROLLED DEFLECTION ROLL AND RELATED REGULATOR

BACKGROUND OF THE INVENTION

The present invention relates to an improved arrangement containing a controlled deflection roll and a related regulation arrangement or regulator system.

In the commonly assigned copending U.S. application Ser. No. 223,238, filed Jan. 8, 1981, entitled "Controlled Deflection Roll", and since issued as U.S. Pat. No. 4,357,743 on Nov. 1, 1983 there is disclosed a controlled deflection roll which constitutes part of a calender arrangement. This arrangement comprises a controlled deflection roll having a roll shell which is supported by means of support or pressure elements against a roll support or beam, and further contains a regulation arrangement for regulating the position of the roll shell. The position of the roll shell, at least at its two ends, is detected by means of position feelers or sensors and deviations from a set or reference value are processed into two adjustment or positioning magnitudes which act upon and influence the support or pressure elements.

With the arrangement disclosed in the aforementioned patent the roll body is constituted by a hollow cylinder in the interior of which there is arranged the roll support or beam. As the counter element there are used further solid rolls of the calender. However, it is to be specifically understood the present invention is not limited to such type of arrangements. For instance, the roll support or beam can be disposed externally of the roll body which, in turn, can be constructed as a solid or hollow cylinder. Also, there can be provided a plurality of roll supports located in appropriate radial planes, which in each case serve to support or brace pressure or support elements. Equally, the counter rolls can be located in one or a number of planes. As the counter elements there also can be provided bands or also a stationary or movable plane possessing plastic or elastic properties and so forth. In all of these cases which are here mentioned only by way of example and not limitation, it is possible to advantageously employ the teachings of the present invention.

With the heretofore known arrangement there are contemplated different possibilities for inputting the adjustment or positioning signals to the individual support or pressure elements or their controls, as the case may be. Thus, for instance there has been disclosed controlling only a portion of the support elements located near the marginal edge or end of the controlled deflection roll by the signal of the next closest situated position feeler or sensor, whereas the support elements at the central or intermediate zone of the controlled deflection roll are influenced in accordance with the working or operating conditions of the calender.

However, during the operation of a calender arrangement containing such a controlled deflection roll further influencing factors are of significance, as will be explained hereinafter:

If, as in this example, the controlled deflection roll is arranged beneath one or a number of coacting counter rolls which, in turn, are mounted in the calender stand or framework in vertically movable bearings, then the roll shell of the controlled deflection roll initially must take-up the load caused by the force of gravity. Depending upon the construction of the system such can already cause an irregular distribution of the supporting force of the individual support or pressure elements. Furthermore, the support or supporting force of the support or pressure elements must be capable of being adjusted in accordance with the desired base load or mean line force prevailing at the roll nip. Additionally, it is desirable if the machine operator can locally correct the pressing or contact force, since it is possible to thus compensate irregularities of the material which is processed at the calender and which irregularities were possibly caused by upstream located equipment or machines. Finally, there also prevails the possibility that, because of irregular friction conditions present in the machine structure, the position of the roll shell detected by the position feelers or sensors at the one side of the roll shell does not coincide with the position of the roll shell at its other side, and this situation likewise must be compensated for by means of the support or pressure elements.

SUMMARY OF THE INVENTION

Therefore, with the foregoing in mind it is a primary object of the present invention to provide an improved arrangement of the character described which is constructed such that all of the aforementioned aspects can be effectively taken into account, notwithstanding that there need be formed only a single adjustment or positioning element for each support or pressure element or even for a plurality of support elements.

Now in order to implement these and still further objects of the invention, which will become more readily apparent as the description proceeds, the arrangement of the present development is manifested by the features that both of the adjustment or positioning magnitudes are formed while taking into account a possible difference between both of the deviations of the respective actual values from their related reference values and thereafter weighted and grouped together with further adjustment or positioning magnitudes and input to the support or pressure elements.

It will be understood that initially both of the position signals delivered by the position sensors or feelers are infed as inputs of separate regulators which, however, have applied thereto, generally, the same reference or set value, and in the normal case upon a change in the reference or set value, starting from the adjusted or regulated operating condition, both position signals would possess the same magnitude. Since, however, both regulators operate independently of one another there can arise a varying deviation of the actual values from the reference values at both sides or ends of the roll shell. This situation is extremely disadvantageous for the operation of the calender, so that it must be handled differently than the normal or standard regulation operation. While the last-mentioned normal or standard regulation operation must transpire with a sufficiently long time-constant, in order to preclude the occurrence of regulation oscillations or fluctuations because of the high inertia of the system, it is to be appreciated that in the event of such type of "irregular" regulation at both sides or ends of the roll shell it is necessary to switch the time-constant, or to introduce a differential lead or rate action, or to ensure in some other conventional manner that this position error is more rapidly eliminated. Only following both of these linked regulation circuits are there provided weighting devices in order to convert the generated regulation signal into adjustment or positioning magnitudes for the support or pressure elements, which will be of different magnitude depending upon the spacing of the support or pressure elements from the related end of the roll shell. There can be added to the weighted adjustment or positioning magnitudes further signals, which are predicated upon manual or automatically predetermined manipulations.

Since the aforementioned irregular level adjustment of the roll shell indicates a disturbance in the mechanical equipment, the corresponding signal is advantageously rendered discernible in the form of a warning or alarm signal.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE of the drawing schematically illustrates a calender arrangement containing a controlled deflection roll and depicts in block circuit diagram the related regulation arrangement or circuitry.

DETAILED DESCRIPTION OF THE PREFERRED EMBODIMENTS

Describing now the drawing, there will be recognized a calender arrangement containing a roll support or beam 1 upon which there is supported the roll shell 2 of a controlled deflection roll by means of suitable force-applying sources or support or pressure elements 3. In the exemplary embodiment under discussion the support or pressure elements 3 are constituted by conventional hydrostatic support bearings, the support or supporting force of which is individually controllable by means of pressure adjustment valves 4 or equivalent structure. The supply of the system with a suitable pressurized fluid medium, typically oil, at a constant high pressure is accomplished by means of the infeed line or conduit 8 as is well known in this technology.

The actual position of the roll shell 2 in relation to a reference position, for instance in the embodiment under discussion in relation to the roll support or beam 1, is detected at both ends or sides of the controlled deflection roll by means of appropriate position sensors or feelers 5 which generate corresponding position signals F1 and F2, for instance in the form of an electrical potential or voltage. These position signals F1 and F2 are transmitted, as shown, by means of the lines or conductors 7 to a regulation arrangement which will be discussed more fully hereinafter. In the exemplary embodiment under discussion the position measurement is directly undertaken at the roll shell 2, but such of course is not absolutely crucial for practicing the invention. Furthermore, it is to be here remarked that the expression "roll shell" as used herein in the context of this disclosure designates a body, here for instance a hollow cylinder; however, in the case of a solid cylinder serving as the controlled deflection roll this terminology is to be understood in a broader and, specifically, geometric sense as constituting the jacket or outer surface of such cylinder.

At the roll stand or framework 10 of the calender arrangement there is mounted a counter roll 11 above which there can be located at least one further roll 12. The roll journals 11' of the counter roll 11, and the further rolls of the calender arrangement, located above the counter roll 11, are housed in suitable bearing blocks 13 or equivalent mounting facilities which are movably guided in the roll stand or framework 10.

The pressure adjustment valves 4, serving as control valves, have inputted thereto the adjustment or positioning signals by means of the lines or conductors 6. By way of example there has been illustrated that, as to the eight depicted support or pressure elements 3, the two outermost ones of such support elements form a respective "zone" Z1 and Z5, both of the next innermost support elements likewise form a respective "zone" Z2 and Z4, and the four innermost support elements 3 conjointly form an intermediate "zone" Z3; this means that each of these zones is individually controllable as concerns its correspondingly applied supporting force.

The adjustment or positioning signals appearing at the lines 6 are generated as follows:

The actual value-signals F1 and F2 are applied to the actual value-inputs 50 and 60 of related regulation amplifiers or regulators R1 and R2, respectively, at whose respective reference value-inputs 55 and 65 there is applied the set or reference value appearing at the line or conductor 14 and which can be altered manually or in accordance with a predetermined program. In the presence of a deviation between the actual value and the reference or set value each of the regulation amplifiers R1 and R2 generates a sign-correct output signal which appears at the related regulator output line 15-1 and 15-2, respectively, and which is then transmitted to a related converter network N1 and N2, respectively, as shown. The converter networks N1 and N2 convert the corresponding adjustment or positioning signal into five summands which, depending upon the distance to the zone which is to be adjusted from the related sensor or feeler 5, can be large or small, i.e. are weighted in relation to such distance and for the zone situated closest to the related feeler or sensor 5 there is generally formed a larger summand, whereas for the zones situated further away such form correspondingly smaller summands. As shown, these magnitudes are then input in each case to a summation element or adder SZ1, SZ2 ... SZ5, and each converter network N1 and N2 delivers a respective summand to each summation element. As a third summand there can be additionally impressed upon the summation elements SZ1, SZ2 ... SZ5 a respective correction signal by means of the correction signal lines KZ1 ... KZ5, by means of which the machine operator is capable of correcting errors which, for instance, are caused at the material which is calendered by upstream located machines, this error correction being possible by individually adjusting or setting the individual zone pressing or contact forces. These correction signals, of course, also could be delivered by the regulators upon which there is impressed as the actual value any suitable magnitude measured at the material behind the related zone.

If, starting from the regulated or adjusted operation there arises a disturbance, then initially both of the position sensors or feelers 5 report the prior position as an actual value to the regulators R1 and R2. This means that both of the signals F1 and F2 generally possess the same absolute value and the same sign. Both regulators R1 and R2 thus operate in the same sense in order to regulate-out or eliminate the disturbance. The regulation time-constant, which defines a delay in the time of response of the regulators is sufficiently long so that, notwithstanding the appreciable inertia of the system, there cannot arise any regulation oscillations or fluctuations.

Because of mechanical disturbances, for instance in the guide arrangement of the counter roll 11 in the roll stand 10, it can however happen that the signals F1 and F2 assume different values, which means that the roll shell 2 is positioned "obliquely" or at an inclination. This undesirable condition must be eliminated as quickly as possible. It is for this reason that there is beneficially provided a comparator 16, at the inputs 70 and 75 of which there are respectively applied the signals F1 and F2, and which comparator 16 generates at the output-side line or conductor 17 an output signal when there is present the condition F1≠F2. This signal is used to act upon the corresponding inputs 58 and 68 of the regulators R1 and R2, respectively, with the result that their regulation time-constant is appreciably shortened. In the exemplary embodiment under discussion there has only been illustrated a single line or conductor 17; however it should be understood that depending upon which end of the roll shell so-to-speak "trails"—which can be recognized by the greater absolute value of the difference between the set or reference value appearing at the line 14 and the position signal F1 or F2—, either the regulator R1 or the regulator R2 can be caused to operate "more rapidly".

It is also useful for the machine operator to know that such type of mechanical disturbance is even present. Therefore, the relevant signal "F2 larger than F1" or "F1 larger than F2" can be beneficially used for, for instance, illuminating a respective control lamp 18 which is operatively correlated to the related position feeler or sensor 5.

It is to be remarked that the position sensors or feelers 5 need not absolutely detect the position of the roll shell 2 relative to the roll support or beam 1. It is also possible that they stationarily or movably detect the position of the roll shell 2 relative to the counter roll 12 or to some other component or part of the system.

Additionally, it is to be mentioned that the summation elements SZ1, SZ2 . . . SZ5 can contain a converter which, as a function of the momentarily desired pressing or contact force (reference or set value appearing at the reference or set line 14) for each individual zone, modifies the formed sum, for instance in accordance with a linear characteristic having a separately determined or fixed slope for each zone.

While there are shown and described present preferred embodiments of the invention, it is to be distinctly understood that the invention is not limited thereto, but may be otherwise variously embodied and practiced within the scope of the following claims. Accordingly,

What we claim is:

1. An arrangement comprising:
a controlled deflection roll;
said controlled deflection roll comprising a roll shell having opposed ends and a roll support;
support elements for supporting said roll shell upon said roll support;
a regulation arrangement for regulating a position of the roll shell;
means for operatively connecting said regulation arrangement with said support elements;
position sensors for detecting the position of the roll shell at least at said opposed ends thereof and cooperating with said regulation arrangement;
the regulation arrangement serving for processing two reference value-actual value differences of the position of the roll shell into two adjustment magnitudes operatively acting upon said support elements;
the regulation arrangement containing circuit means for forming both of said two adjustment magnitudes, while taking into account a possible difference between both of said two reference value-actual value differences and for thereafter transforming the same into a plurality of weighted adjustment values and summing them together with further such adjustment values, and inputting such summed adjustment values to the support elements;
said circuit means of said regulation arrangement containing at least two regulation circuits possessing regulation time-constants for defining a response time—delay of said at least two regulation circuits;
said circuit means of said regulation arrangement further containing time-constant altering means which alter said regulation time-constant of at least one of said two regulation circuits when there are present different reference value-actual value differences of the roll shell; both of said two regulation circuits possessing relatively high regulation time-constants when there are present two substantially equal reference value-actual value differences; and
the regulation time-constant of at least one of the two regulation circuits being reduced by said time-constant altering means when there are present two substantially different reference value-actual value differences.

2. The arrangement as defined in claim 1, wherein:
said time-constant altering means serve for switching said regulation time-constants of said regulation circuits between two predetermined values.

3. The arrangement as defined in claim 1, wherein:
said circuit means of said regulation arrangement contains structure for accomplishing a transformation of said adjustment magnitudes into said plurality of weighted adjustment values as a function of said detected position of said roll shell.

4. The arrangement as defined in claim 1, wherein:
said circuit means of said regulation arrangement detects possible differences between both of said two reference value-actual value differences which possible differences are used to generate a trigger signal for a warning device.

5. The arrangement as defined in claim 4, wherein:
said trigger signal is generated by a comparator of said circuit means.

6. The combination of:
a controlled deflection roll which comprises:
a roll support;
a roll shell having a prescribed reference position and two opposed end regions;
support elements supporting said roll shell upon said roll support to define an actual position of the roll shell;
a regulation arrangement acting on said support elements of the controlled deflection roll and comprising:
sensing means for detecting said actual position of the roll shell at least at said two opposed end regions of the roll shell;
adjustment means operatively associated with the support elements and said regulation arrangement;
circuit means comprising:

at least two regulation circuits each having a relatively high regulation time-constant for defining a relatively high response time delay of said at least two regulation circuits;

time-constant altering means active upon each of said at least two regulation circuits;

each of said at least two regulation circuits generating an adjustment magnitude from a possible deviation of the actual position of the roll shell detected at a respective one of said two opposed end regions from said reference position of the roll shell and thereafter transforming said adjustment magnitude into at least one plurality of weighted adjustment values;

said circuit means summing associated ones of said weighted adjustment values together to form an adjustment signal and supplying said adjustment signal to said adjustment means of the support elements to act upon the adjustment means; and said time-constant altering means reducing said regulation time-constant of at least one of said two regulation circuits when said possible deviation of the actual position of the roll shell detected at one of said two opposed end regions from the reference position of the roll shell differs substantially from said possible deviation of the actual position of the roll shell detected at the other of the two opposed end regions from the reference position of the roll shell.

* * * * *

UNITED STATES PATENT AND TRADEMARK OFFICE
CERTIFICATE OF CORRECTION

PATENT NO. : 4,509,237
DATED : April 9, 1985
INVENTOR(S) : KARL VOLZ et al

It is certified that error appears in the above—identified patent and that said Letters Patent is hereby corrected as shown below:

Column 2, line 38, after "and" (first occurrence) and before "thereafter" please insert --are--

Column 3, line 23, please delete "circuity" and insert --circuitry--

Column 6, line 22, after "shell;" please begin a new paragraph on the next line starting with "both of said two regula-"

Signed and Sealed this

Twenty-fourth Day of September 1985

[SEAL]

Attest:

DONALD J. QUIGG

Attesting Officer

Commissioner of Patents and
Trademarks—Designate